United States Patent Office 3,786,066
Patented Jan. 15, 1974

3,786,066
PROCESS FOR PREPARING
ε-THIOCAPROLACTONES
Peter Ernst Fritze, West Millington, N.J., assignor to
Union Carbide Corporation, New York, N.Y.
No Drawing. Filed Sept. 11, 1970, Ser. No. 71,344
Int. Cl. C07d 67/00
U.S. Cl. 260—327 R                                    18 Claims

ABSTRACT OF THE DISCLOSURE

Substituted and unsubstituted ε-thiocaprolactones are readily prepared in a two step process. In the first step an ε-caprolactone and carbon disulfide or carbonyl sulfide are reacted to an oligomer product, and in the second step the oligomer product undergoes a base catalyzed rearrangement to form the ε-thiocaprolactone.

BACKGROUND OF THE INVENTION

(1) Field of the invention

The invention relates to a process for preparing ε-thiocaprolactones.

(2) Description of the prior art

ε-Thiocaprolactones are known monomeric materials which are useful in monomeric form for various purposes; i.e., as solvents; as initiators in the anionic polymerization of lactams such as ε-caprolactam; and as monomeric precursors to poly ε-thiocaprolactones. The polymeric forms of these monomers are useful as plasticizers for vinyl resins.

C. G. Overberger and Jurgen K. Weise disclose the preparation of ε-thiocaprolactone by the cyclization of 6-mercaptohexanoic acid in the Journal of the American Chemical Society, vol. 90, pages 3533 to 3537 (1968). This procedure for preparing ε-thiocaprolactone is not acceptable for commercial purposes because the yields are relatively low and the raw materials are relatively expensive.

German Pat. 859,456 discloses the preparation of γ-thiobutyrolactone and δ-thiovalerolactone by reacting the corresponding lactone with hydrogen sulfide at elevated temperatures in the presence of small amounts of alkaline materials.

SUMMARY OF THE INVENTION

Substituted or unsubstituted ε-thiocaprolactones are prepared in a two step reaction wherein, in the first step, the corresponding lactone and carbon disulfide or carbonyl sulfide are reacted to form an oligomer product, which oligomeric product is then caused to undergo a base catalyzed rearrangement to form the ε-thiocaprolactone.

The object of the present invention is to provide a novel and economical process for the preparation, in good yields, of ε-thiocaprolactones.

DESCRIPTION OF THE PREFERRED EMBODIMENT

It has now been found that ε-thiocaprolactones can be readily prepared in relatively high yields using relatively inexpensive raw materials by a two step process wherein, in the first step, the corresponding lactone and carbon disulfide or carbonyl sulfide are reacted to form an oligomeric product, and in the second step, the resulting oligomeric product is depolymerized or rearranged to form the desired thiolactone.

The lactones which are used have the structure:

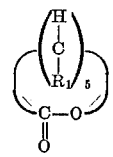

wherein each $R_1$ is the same or different, and is H or $C_1$ to $C_4$ hydrocarbon. The lactones to be used are those having boiling points, at atmospheric pressure, of about $\leq 350°$ C.

The thiolactone made from the corresponding lactone will thus have the structure

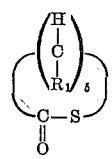

wherein $R_1$ is as defined above.

The first step of the process involving the reacting of the $CS_2$ or COS with the lactones is preferably conducted in the presence of a catalytic amount of strong base, and at a temperature of $\geq 175°$ C. for $\geq 5$ hrs. under a pressure of $\geq 250$ pounds per square inch (p.s.i.) absolute. Where the lactone used is ε-caprolactone the reaction conditions are preferably a temperature of 200° to 225° C. and a pressure of 250 to 800 p.s.i.

About 0.2 to 4 mol percent of the strong base is used in the first step of the reaction, based on the mols of lactone being reacted. The strong bases are those which are soluble in the step I reaction mixture and are materials which are capable of reacting with COS or $CS_2$ under the described reaction conditions to form the catalyst species [Anion —C=S—S—] or [Anion —C=O—S—] where "Anion" is the anion of the base being used. These bases include hydroxides, $C_1$ to $C_4$ alkoxides, phenoxides, sulfides and hydrosulfides of metals of Groups I and II of the Mendeleev Periodic Table of the elements. Specific examples of such bases are materials such as sodium methoxide, potassium methoxide, sodium sulfide, sodium hydroxide, potassium hydroxide, potassium sulfide, sodium hydrosulfide and potassium hydrosulfide.

Sodium methoxide is the preferred catalyst since it provides the highest yields, i.e. of the order of $\geq 70$ to 85%, in the fastest reaction times with a minimum amount of degradation occurring to the oligomeric intermediate product. The use of some of the other strong bases, although providing high yields, has some disadvantages, i.e., the use of potassium hydroxide tends to lead to a more substantial amount of degradation of the oligomeric intermediate product and the use of sodium sulfide results in a relatively slower reaction and the resulting yields are somewhat lower.

Attempts to use other less basic materials such as zinc sulfide, lithium sulfide and triphenyl phosphene in the first step of the process were unsuccessful.

Attempts to use potential sulfur donating materials other than carbon disulfide or carbonyl sulfide in the first step of the process i.e., $H_2S$ and S were also relatively unsuccessful.

The intermediate oligomeric product which is formed in the first step of the process is a solid which is believed to have the structure:

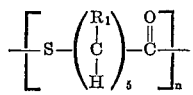

wherein n' is a whole nuber of 5 to 50, and $R_1$ is as defined above.

A molar excess of the carbon disulfide or carbonyl sulfide (with respect to the mols of lactone) is used in the first step of the reaction since it also functions as a solvent for the intermediate low molecular weight oligomer product and thus improves conversions and ease of handling. The preferred reaction conditions for step one of the process are temperatures of 200–225° C. for ≥10 hours. At lower temperatures the conversion appears to drop off markedly in spite of any lengthening of the reaction cycle. And at higher temperatures the decomposition of the oligomeric product into undesired by-products becomes more pronounced.

Prior to the initiation of the second step of the process it is preferable to remove the excess carbon disulfide or carbonyl sulfide, as by devolatilization. The depolymerization of the oligomeric product in the second step of the process is then preferably conducted under reduced pressures of the order of about ≥15 mm. of mercury at a temperature of about ≥210° C. for about one or more hours. When the thiolactone being prepared is ε-thiocaprolactone, the preferred conditions are a pressure of 15–100 mm. Hg and a temperature of 210–300° C. for 1–3 hours.

The step two phase of the process is conducted in the presence of the same catalyst as is used in step one and in the presence of unreacted lactone.

When carbon disulfide is used as the sulphur donating compound to prepare ε-thiocaprolactone from ε-caprolactone in the process of the present invention, yields of ≥70 to 85% are obtained in the form of an approximately 9:1 mixture by weight of ε-thiocaprolactone and ε-caprolactone. This end product can also contain a few weight percent of low boiling components which may be readily removed by column distillation.

Column distillation techniques may only be used to effectuate a crude separation of the ε-caprolactone from the ε-thiocaprolactone. A more effective distillation is not readily possible under column distillation techniques because of the very similar boiling points of these two monomeric materials. The selective and complete removal, however, of residual quantities of ε-caprolactone from the ε-thiocaprolactone can be accomplished by extraction of the ε-caprolactone with cold 0.5 N aqueous sodium hydroxide. This extraction technique provides ε-thiocaprolactone of greater than 99.7% purity as determined by gas chromatography.

The following examples are merely illustrative of the teachings of the present invention and are not intended as a limitation upon the scope thereof.

EXAMPLES

Preparation of ε-thiocaprolactone

A three liter, nitrogen filled pressure vessel containing 684 g. (6 moles) of ε-caprolactone, 1520 g. (20 moles) of carbon disulfide and 6.48 g. (0.12 moles; 2 mole percent) of sodium methoxide was heated for 10 hours at 200° C. A dark colored polymeric material was thereby produced. The polymeric material is a solid at room temperature in the absence of solvents.

After removal of excess carbon disulfide by distillation, a further 6 g. (0.12 moles; 2 mole percent) of sodium methoxide was added to the reaction vessel and the dark polymer was depolymerized over a period of about 2 hours at 250–300° C. under a pressure of 30 mm. Hg. 663 g. (5.1 moles; 85% yield) of a red liquid was produced and isolated. This red liquid contained a ≥9:1 by weight mixture of ε-thiocaprolactone and ε-caprolactone, and <5% by weight of lower boiling components. The lower boiling values were removed by distillation under oil vacuum, over a 2 ft. glass bead-filled column. The slightly yellow ε-thiocaprolactone, now containing <10% by weight of ε-caprolactone and about 0.5% by weight of other impurities, had a B.P. 50–55°/0.2 mm. Hg and density of 1.09.

Hydrolytic separation of ε-caprolactone from ε-thiocaprolactone 52 g. of (0.4 moles) of the crude ε-thiocaprolactone prepared above, containing <10% by weight of ε-caprolactone was dissolved in 200 ml. benzene and then shaken out four times with a total of 320 ml. of ice cold aqueous 0.5 NaOH. The system was then dried with anhydrous $Na_2SO_4$ and the benzene was removed by distillation to yield 42 g. (0.325 moles; 90% yield based on ε-caprolactone initially charged) of >99.7% pure ε-thiocaprolactone (B.P. 151–153° C./30 mm. Hg).

What is claimed is:

1. A process which comprises reacting at a temperature of ≥175° C. and under a pressure of ≥250 pounds per square inch absolute for at least five hours, a lactone of the structure:

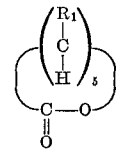

wherein the $R_1$'s are the same or different, and are H or $C_1$ to $C_4$ hydrocarbon with carbon disulfide or carbonyl sulfide in the presence of a strong base which is soluble in the presence of the resulting reaction mixture to form a solid oligomeric product having repeating units of the structure:

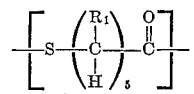

2. A process as in claim 1 in which said strong base is selected from the group consisting of the hydroxides, $C_1$ to $C_4$ alkoxides, sulfides, phenoxides, and hydrosulfides of metals of Groups I and II of the Mendeleev Periodic Table of the elements.

3. A process as in claim 2 in which said lactone is reacted with carbon disulfide.

4. A process as in claim 3 in which said lactone is ε-caprolactone.

5. A process as in claim 4 in which said strong base is sodium methoxide.

6. A process as in claim 4 in which said strong base is potassium hydroxide.

7. A process as in claim 4 in which said strong base is sodium sulfide.

8. A process which comprises depolymerizing an oligomeric material having repeating units of the structure:

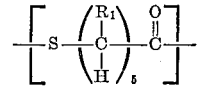

wherein the $R_1$'s are the same or different and are H or $C_1$ to $C_4$ hydrocarbon by heating said oligomer at a temperature of ≥210° C. and under reduced pressure in the presence of a strong base to form a monomer of the structure:

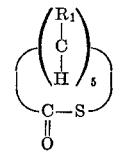

9. A process as in claim 8 in which said strong base is selected from the group consisting of the hydroxides, C to $C_4$ alkoxides, phenoxides, sulfides and hydrosulfides of metals of Groups I and II of the Mendeleev Periodic Table of the elements.

10. A process as in claim 9 in which $R_1$ is H.

11. A process as in claim 10 wherein said strong base is sodium methoxide.

12. A process as in claim 10 wherein said strong base is potassium hydroxide.

13. A process as in claim 10 wherein said strong base is sodium sulfide.

14. A process for preparing ε-thiocaprolactone which comprises:
(a) reacting ε-caprolactone with a molar excess of carbon disulfide or carbonyl sulfide in the presence of catalytic quantities of a strong base at a temperature of $\geq 175°$ C. and under a pressure of $\geq 250$ pounds per square inch absolute for at least 5 hours to form a solid oligomeric product having repeating units of the structure:

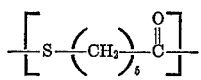

(b) separating the unreacted carbon disulfide or carbonyl sulfide from said oligomeric product, and (c) depolymerizing said oligomeric product in the presence of said strong base and at a temperature of 210 to 300° C. and under reduced pressure to form said ε-thiocaprolactone.

15. A process as in claim 14 in which said ε-caprolactone is reacted with carbon disulfide.

16. A process as in claim 9 in which said strong base is sodium methoxide.

17. A process as in claim 9 in which said strong base is potassium hydroxide.

18. A process as in claim 9 in which said strong base is sodium sulfide.

References Cited

UNITED STATES PATENTS 2,978,460    4/1961    Bartlett et al. _____ 260—332.3

FOREIGN PATENTS 809,557    5/1951    Germany _____ 260—327
859,456    10/1952    Germany _____ 260—327

HENRY R. JILES, Primary Examiner

C. M. S. JOISLE, Assistant Examiner

U.S. Cl. X.R.

260—30.2